United States Patent [19]
Boberg

[11] 3,865,767
[45] Feb. 11, 1975

[54] POLYMER COMPOSITION DEGRADABLE UNDER THE INFLUENCE OF ULTRAVIOLET LIGHT AND/OR SUNLIGHT

[75] Inventor: Ånders Boberg, Jonkoping, Sweden

[73] Assignee: Akerlung & Rausing, Lund, Sweden

[22] Filed: Sept. 13, 1972

[21] Appl. No.: 288,604

[30] Foreign Application Priority Data
Sept. 14, 1971 Sweden.............................. 11625/71

[52] U.S. Cl......... 260/23 H, 204/159.14, 260/23 H, 260/93.5 A, 260/94.7 D, 260/94.9 GC, 260/96 D, 260/DIG. 43
[51] Int. Cl. ............................................. C08f 21/04
[58] Field of Search... 260/DIG. 43, 94.9 GC, 96 D, 260/94.7 D, 93.5 A, 23 S, 23 H; 204/159.14

[56] References Cited
UNITED STATES PATENTS
3,592,792  7/1971  Newland et al.............. 260/DIG. 43
3,676,401  7/1972  Henry.......................... 260/DIG. 43

OTHER PUBLICATIONS
Chemical Abstracts, Vol. 68, 1968, No. 79358gh & j.

*Primary Examiner*—Melvyn I. Marquis

[57] ABSTRACT

A polymer composition is provided which is degradable under the influence of ultraviolet light and/or sunlight and the polymer component of which comprises thermoplastic polymers of α-olefins, or comprises polystyrene. The composition contains an additive which is soluble therein and photolyzable and which consists of an iron compound acting both as an initiator and a propagator.

5 Claims, 5 Drawing Figures

POLYMER COMPOSITION DEGRADABLE UNDER THE INFLUENCE OF ULTRAVIOLET LIGHT AND/OR SUNLIGHT

The present invention relates to a polymer composition which is degradable under the influence of ultraviolet light and/or sunlight.

In the debate on environmental pollution which is attracting increasingly more attention and is being conducted increasingly intensely various kinds of packages have often been subjected to a critical examination. This applies in particular to throw-away packages of glass, metal, plastics and combinations of plastics and cardboard. The volume of domestic wastes is at present 250 kg per person and annum. The volume of plastics in the wastes is estimated at between 1 and 5 per cent. A special problem is presented by wastes spread over large areas, e.g., along roads or beaches, and collecting such wastes is very expensive. The quantity of throw-away packages is a substantial part of these wastes. Previously, chiefly cardboard and paper were used as packaging materials, and their cellulose fibres were relatively quickly degraded in the outdoor environment. The packaging industry has been forced to solve increasingly complicated packaging problems resulting in the necessity to use various polymer materials having in many cases a very high resistance to outdoor degradation. As a result of this the outdoor degradation will often take a very long time and consequently the volume of this kind of wastes may be accumulated in nature from year to year.

There is consequently a very large need for obtaining a polymer composition from which various types of packages can be produced having a limited durability but which will, while in use, fulfil the demands placed on their function as packages.

It is consequently a primary object of the present invention to obtain a polymer composition fulfilling the above-mentioned demands.

The polymer forming part of the polymer composition according to the invention may consist of thermoplastic polymers of α-olefins, such as polyethylene, comprising both HD-polyethylene and LD-polyethylene, polypropylene but also of polystyrene and the like. It should be observed that even if polyethylene is very often mentioned in the specification of the present application the invention is not restricted to this kind of polymer.

Outdoor degradation of polyethylene, for instance, entails that its mechanical properties deteriorate as a result of the action of the environment. The following factors are generally considered to be the principal reasons for the outdoor degradation of polymers:

a. sunlight,
b. temperature,
c. air humidity,
d. air oxygen,
e. chemicals,
f. microorganisms.

With respect to its wavelength the solar spectrum is divided into ultraviolet light, visible light and infrared radiation or heat radiation. The ultraviolet light contains more energy than both visible light and heat radiation. Despite the fact that only 4 per cent of the solar radiation which reaches the surface of the earth consists of ultraviolet light this has a very great importance for the chemical and mechanical changes obtained when exposing various polymers to outdoor light. Sunlight consequently has the property of supplying to absorbing groups in polyethylene, for instance, such a quantity of energy that degradation processes may occur. It is known that an increase of the temperature will accelerate the degradation process after this process has been initiated by ultraviolet light. A large number of the degradation reactions which occur are dependent on the temperature. The air humdity accelerates the degradation of polymers when water condenses on the polymer surface. Cyclic changes between high and low relative humidity are also known to increase the degradation rate for many polymers. A photochemical degradation in the presence of oxygen is called photooxidation and without oxygen the outdoor degradation of many commercial polymers would take place extremely slowly. As a matter of fact, oxygen has the property of being added to certain reactive centres in the polymer and to create hydroperoxides which can be photolyzed to free radicals. These are highly reactive and may abstract hydrogen from the polymer chains while forming new radicals. Unless the possibilities of recombination between free radicals were so great, degradation would take place at a very high rate. Combinations of radicals are examples of termination reactions, i.e., reactions which do not contribute to a progressive degradation. Degradation may also be accelerated by means of chemicals. With respect to exposition to outdoor light this means that there are possibilities of obtaining a higher degradation rate due to impurities in the atmosphere. However, this exterior action by chemicals is not of decisive importance for the stability of polyethylene. Degradation may also take place by means of microorganisms but in general it seems that degradation of pure polymers will take place very slowly.

Degradation according to the invention, as set forth in the following discussion, is essentially characterized by exposing to ultraviolet radiation a polymer composition containing an additive promoting degradation. Such a degradation is often called sensitized degradation. The British Pat. specification No. 1,128,793 describes that copolymers of ethylene and carbon monoxide are degradable under the influence of sunlight. The patent specification also mentions that the rate of degradation may be accelerated further by adding certain metal organic compounds, such as ferrocene or salts of iron, copper or manganese. However, the patent specification points out in quite general terms that metal salts which are known to accelerate oxidation of the above polymers in ultraviolet light are suitable as additives. Ferrocene is a yellow solid compound having a high vapour pressure. The compound is soluble in LD-polyethylene but the high vapour pressure of the compound entails that the ferrocene will evaporate quickly after mixing and will consequently leave the polymer. The compound consequently cannot be used at all as a practical additive in LD-polyethylene, for instance.

The U.S. Pat. specification No. 3,454,510 indicates that degradation of polyethylene and other polyolefins may be accelerated by adding certain metal organic compounds, such as metal acetyl acetonates, metal alkyl acetoacetates, metal stearates and metal oleates. These compounds act as prooxidants and the effective content is indicated at 0.01 to 1.5 per cent by weight. The patent specification describes that carbon black may be mixed into the polymer in question. The carbon black will probably spread the ultraviolet light in the surface layer of the polymer and will prevent the light from penetrating into the polymer. The fact that according to the patent specification an increased degradation rate is achieved is hardly due to ultraviolet light but rather depends on thermal factors. A catalysis of the hydroperoxide degradation is probably the reason for the results obtained in the patent specification.

Before the invention is described in detail an account will be given below of the theories which are the basis of the invention. In order to give an illustrative example polyethylene is chosen as an example of the polymer which is part of the composition according to the invention but this should not be considered to limit the scope of the invention, since also other polymers, such as those mentioned above, may form part of the composition.

Outdoor degradation of polyethylene in sunlight is largely equivalent to photooxidation thereof. There is, in fact, a system of three components taking part, viz. polyethylene, oxygen and ultraviolet light. The photooxidation may be initiated in two different ways, viz. through primary initiation, which occurs when ultraviolet light is absorbed directly by functional groups in an oxidizable substrate, is absorbed by the oxidation agent (the oxygen) or by an oxygen-substrate complex, and secondary initiation, which takes place when the ultraviolet light is absorbed by groups of the substrate containing oxygen, e.g., polymeric carbonyl groups or hydroperoxides or other impurities, such as catalyst rests or the like. To polyethylene the secondary initiation is of dominating importance. The initiation reactions are the first part of the schedule of the general autooxidation mechanism which was described abbout 30 years ago for thermal oxidation of hydrocarbons (RH). Reference is made to Bolland JL, Gee G, Trans. Faraday Soc. 42-236 (1946) 244.

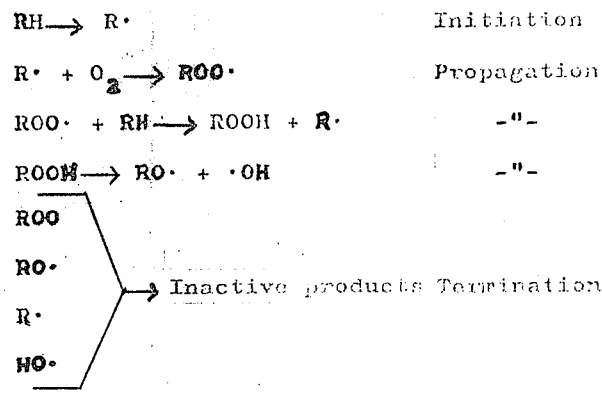

Although photooxidation of polyethylene is considered to take place without autocatalysis, this simplified schedule may still be regarded as an example of a possible reaction mechanism according to which the reactions according to the invention may take place. Thus, the initiation reactions describe the property of the polyethylene of forming free radicals (R.) and the rate constants of these reactions are of decisive importance for the degradation time.

As mentioned above, the primary initiation is of less importance for the degradation of polyethylene, for which reason only the secondary initiation will be described. The secondary initiation is caused by impurities in the polymer, e.g., ultraviolet light absorbing carbonyl groups or metals. The following absorption centres may be considered to cause the initiation reactions:

a. Carbonyl groups such as ketones and aldehydes,
b. Unsaturations,
c. Peroxides and hydroperoxides. All of these groups are formed in polyethylene during the polymerization or at a subsequent processing.

The carbonyl groups may initiate the photodegradation of polyethylene in two ways. Firstly, they may form free radicals purely photolytically, i.e., without the presence of oxygen. Secondly, they may be excited by ultraviolet light and may then transmit their energy to oxygen molecules intermolecularly. In both cases the final result is considered to be that free radicals are formed. With respect to the kinetic treatment of these initiation reactions reference is made to literature in this field. It should also be held forth that the structure of the polyethylene is of importance for the rate at which free radicals are formed under ultraviolet radiation. Oxidation takes place most quickly in the amorphous parts, i.e., those parts which are characterized by a structural disorder and which may consequently contain a greater percentage of oxygen gas.

The propagation reactions describe the ability of the free radicals to react further with the polyethylene while forming new free radicals. Among these we may mention alkyl radicals, allyl radicals and peroxide radicals. In polyethylene unsaturations are formed during the degradation process which, similarly to the pure polyethylene chains, may be attacked by free radicals, e.g., peroxide radicals.

Termination reactions, i.e., the recombination between free radicals, give rise to a large quantity of degradation products. The kinetic treatment of the various termination stages is highly complicated. Among the degradation products which are assumed to be formed in polyethylene under ultraviolet radiation in the presence of oxygen gas there are ketones, carboxylic acids, aldehydes, esters, peroxide compounds, unsaturations, ethers, alcohols, low molecular alkanes, water and carbon oxides.

The invention consequently relates to a polymer composition which is degradable under the influence of ultraviolet light and/or sunlight and the polymer component of which comprises thermoplastic polymers of $\alpha$-olefins, preferably polyethylene, or comprises polystyrene, and the composition is characterized in that it contains an additive soluble therein consisting of an iron compound acting both as an initiator and a propagator having the general formula X-Fe, coupled with one or several ligands Y making X-Fe soluble in the polymer of the composition, X being one or several ligands, making the additive photolyzable.

In the iron compound indicated above the iron may have any oxidation number and this oxidation number is determined by the appearance of X. As an instance of the iron compound X-Fe we may mention the compounds in which the ligand X consists of at least one of $OH^-$, $Cl^-$, $Br^-$, $I^-$, oxalate $^=$, acid citrate$^=$, $NO_2^-$, $N_3^-$, EDTA ethylene diamine tetraacetic, carbonyl, nitrosyl, or porfyrin derivatives.

X-Fe is photolyzed when being exposed to light and this photolysis takes place under reduction of the iron nucleus and oxidation of the ligand (ligands) or vice versa. At the photolysis the oxidation (reduction) products which are formed may create free radicals of the polymer and may thus initiate the degradation.

When a compound X-Fe is exposed to light, X consisting for instance of a hydroxyl ion the following takes place:

$$Fe^{3+}OH^- + h\nu \rightarrow /Fe^{2+}OH/$$

$$/Fe^{2+}OH/ \rightarrow Fe^{2+} + OH.$$

The iron is reduced under the action of ultraviolet light and forms a "complex" with OH. This complex then disintegrates into a hydroxy radical and a divalent iron ion.

When, for instance, the compound described above is mixed into a polymer, such as polyethylene, the following takes place. If the hydroxy radical (OH.) formed does not re-react with the iron, it will in all probability instead react with the polymer (RH):

$$OH. + RH \rightarrow H_2O + R.$$

The alkyl radical formed is very active and may react with oxygen gas as follows:

$$R. + O_2 \rightarrow ROO.$$

The peroxy radical formed may then tear loose a hydrogen from for instance an adjacent polymer molecule:

$$ROO. + RH \rightarrow ROOH + R.$$

$Fe^{3+}$ has previously been reduced by the ultraviolet light to $Fe^{2+}$, but $Fe^{2+}$ and ROOH (hydroperoxide) may react directly:

$$Fe^{2+} + ROOH \rightarrow Fe^{3+} + OH^- + RO.$$

We are thus back at the starting position in that $Fe^{3+}$ and $OH^-$ are formed adjacent each other:

$$Fe^{3+} + OH^- \rightarrow Fe^{3+}OH^-$$

Thereafter the process may be repeated as long as the polymer is exposed to sunlight. According to the invention a degradable polymer composition has consequently been obtained which contains an iron compound or alternatively a compound of another transition metal acting both as initiator and propagator, i.e., hydroperoxide degradator.

However, in order to obtain a rapid degradation it is necessary that the admixed additive is soluble in the plastics. The compounds X-Fe indicated above, where X has the meaning indicated above, are often slightly soluble in plastics. In order to increase the solubility of these compounds it is possible to connect one or more ligands Y to the compounds indicated above. Preferably, Y is connected in such a way to the compound X-Fe that a compound having the formula X-Fe-Y is obtained. As mentioned above, Y is one or more ligands and preferably consists of a carboxylic acid ion. The corresponding carboxylic acid consists of aromatic or aliphatic monocarboxylic acids or dicarboxylic acids, the aliphatic carboxylic acids preferably contain 6 to 25 carbon atoms.

Typical examples of the carboxylic acids according to what has been mentioned above are caprylic acid, stearic acid, palmitic acid, oleic acid, pelargonic acid, derivatives of malonic acid, sebasic acid, benzoic acid and derivatives thereof, phthalic acid and derivatives thereof. The link between Fe and the ligand does not however necessarily have to consist of the group $COO^-$ as for instance in carboxylic acids. The iron may be bonded to Y in a great many other ways, which appears for instance from "Chelating Agents and Metal Chelates" (Dwyer and Mellor, Academic Press, New York, 1964). However, the inexpensive and nontoxic carboxylic acids are preferable according to the invention.

Trivalent iron occurs most often in octahedric coordination with its ligands, i.e., six ligands are bonded to each iron nucleus. The ligand may consist of an ion containing only one atom (e.g., $Cl^-$), or several (e.g., $OH^-$, $stearate^-$), or else uncharged molecules (e.g., pyridine, water or ammonia). According to the invention it has been found that a compound X-Fe-Y, where X for instance is $OH^-$ and Y is a carboxylic acid ion, e.g., $stearate^-$, yields better solubility in polyethylene, for instance.

The new additive promoting degradation which forms part of the composition according to the invention has consequently the general formula X-Fe-Y according to a preferred embodiment, where X is one or more ligands making X-Fe photolyzable, and Y is any type of ligand or ligands having the property of making the additive molecules soluble and incapable of migration in polyethylene or other polymers.

An additive in the nature of a compound of the preferred type X-Fe-Y gives rise to the following advantages if X and Y are chosen in the right manner. These advantages are a low additive content with respect to iron, which in turn entails that the plastics undergo an unimportant discoloration, if any at all, good solubility therein, insignificant migration tendency, mostly low toxicity, and low production costs.

The amount of additive is dependent on the molecular weight of the additive but will as a rule amount to 0.01 to 2.0 per cent by weight, preferably 0.5 per cent by weight.

In order to obtain a still better degradation effect it is possible to add to the polymer composition according to the invention a substance accelerating photolysis of X-Fe (X-Fe-Y) but it should be held forth that such a substance is not necessary in the composition according to the invention. As an instance of these substances we may however mention aromatic or alkyl aromatic ketones, benzophenone, acetophenone, antrone or derivatives of all these.

If the degradation rate of a polymer is to be accelerated by initiating the formation of free radicals (R.) or if the hydroperoxide degradation is to be accelerated, this may in principle be done by adding two different types of compounds promoting these degradation reactions. However, in a solid polymer it is necessary that the hydroperoxide degradator is immediately adjacent the initiator, i.e., where the free radicals are formed, e.g., as follows:

$$\text{Initiator} + RH \rightarrow R.$$

$$R. + O_2 \rightarrow ROO.$$

$$ROO. + RH \rightarrow ROOH + R.$$

$$ROOH + \text{hydroperoxide degradator} \rightarrow$$

The reason why this nearness is necessary is that (packaging) polymers are high molecular solid phases, where inter alia free radicals are so to speak frozen with a very restricted mobility.

In order to achieve a high degradation rate with the two-component system described above, relatively high contents of the two additives are probably required, in which case the probability increases that the two additives will become located adjacent each other. In the present invention this disadvantage is avoided in that the degradation promoting additive achieves both initiation and hydroperoxide degradation simultaneously.

In the appended drawings

Figure 1:
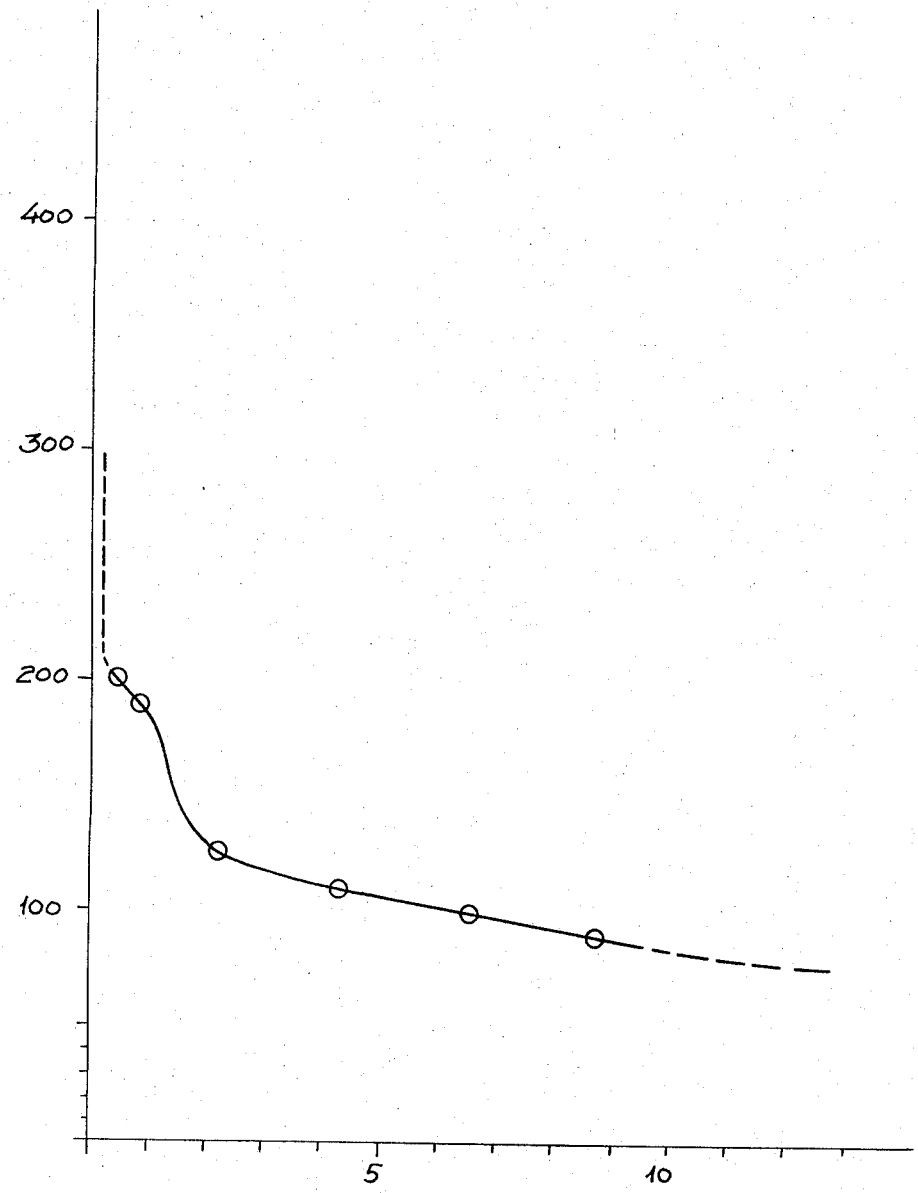
FIG. 1 is a diagram showing the time in hours for making film totally brittle in a so-called Xenotest as a function of the additive content of iron in polyethylene.
Figure 2:
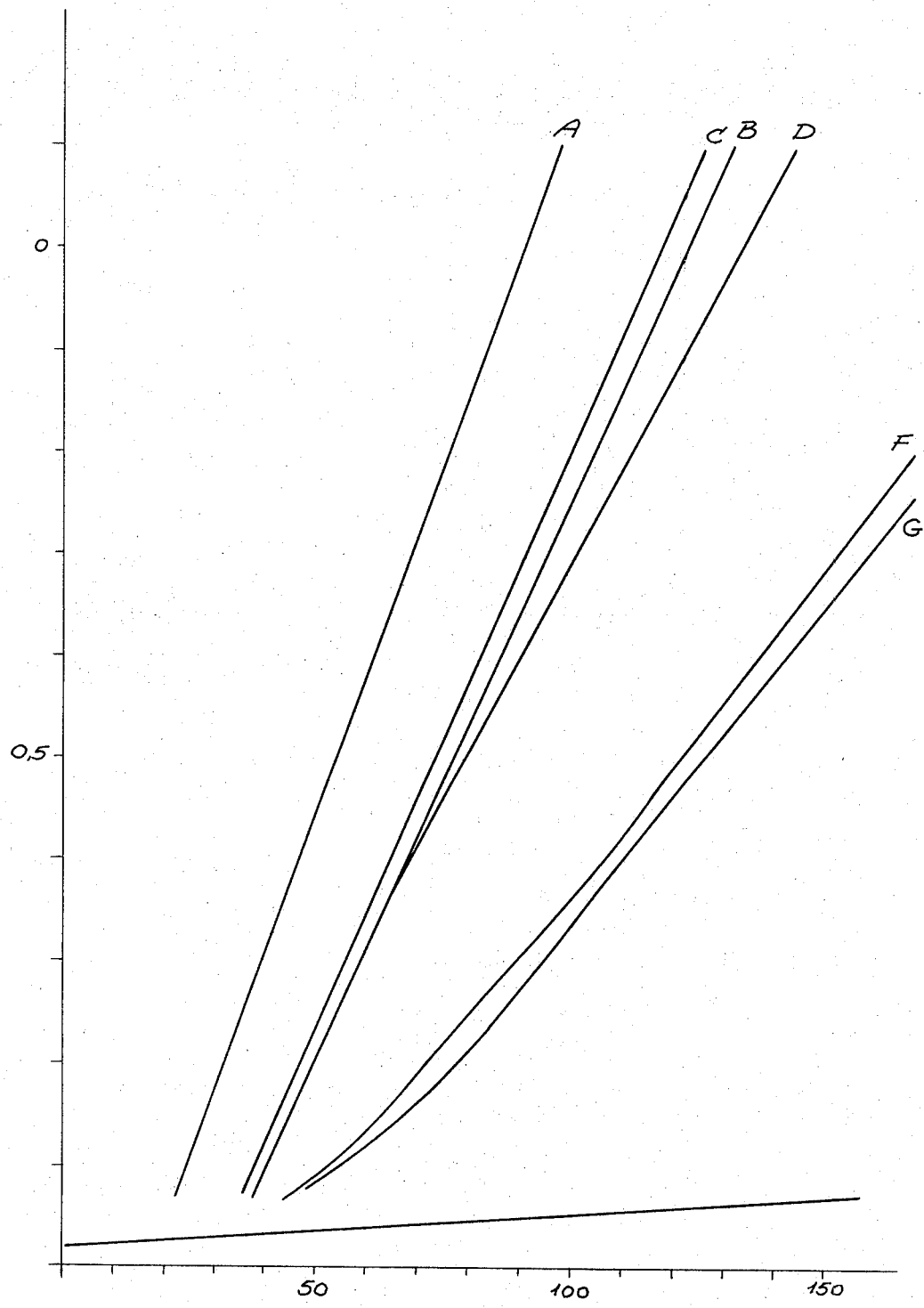
FIG. 2 shows the absorbance at 1770 cm$^{-1}$ as a function of the radiation time for a number of films prepared in accordance with the invention.
Figure 3:
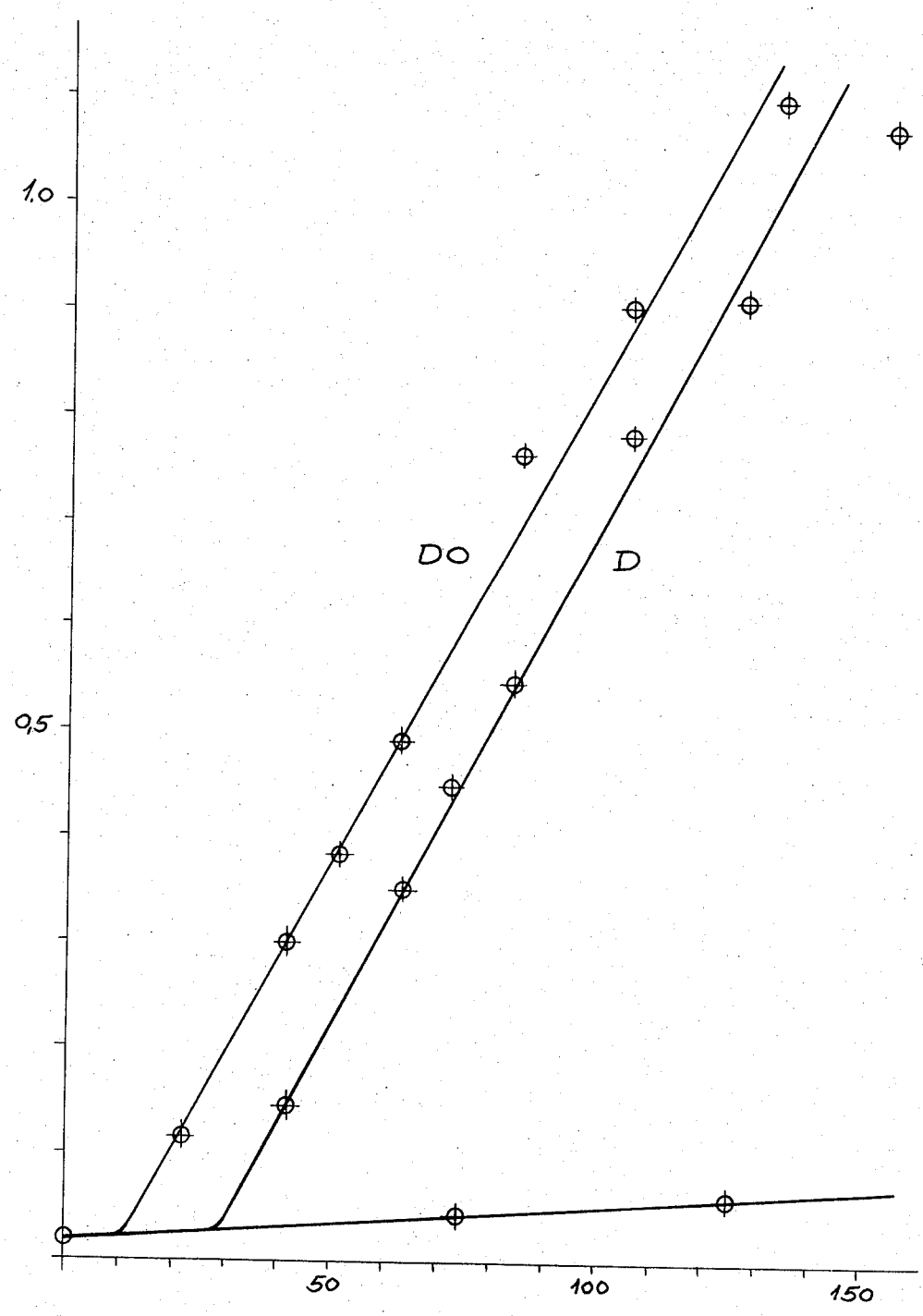
FIGS. 3 to 5 are diagrams similar to the diagram shown in FIG. 2 but where polyethylene has had different contents of the additive according to the invention added, in some cases together with an initiator.
Figure 4:
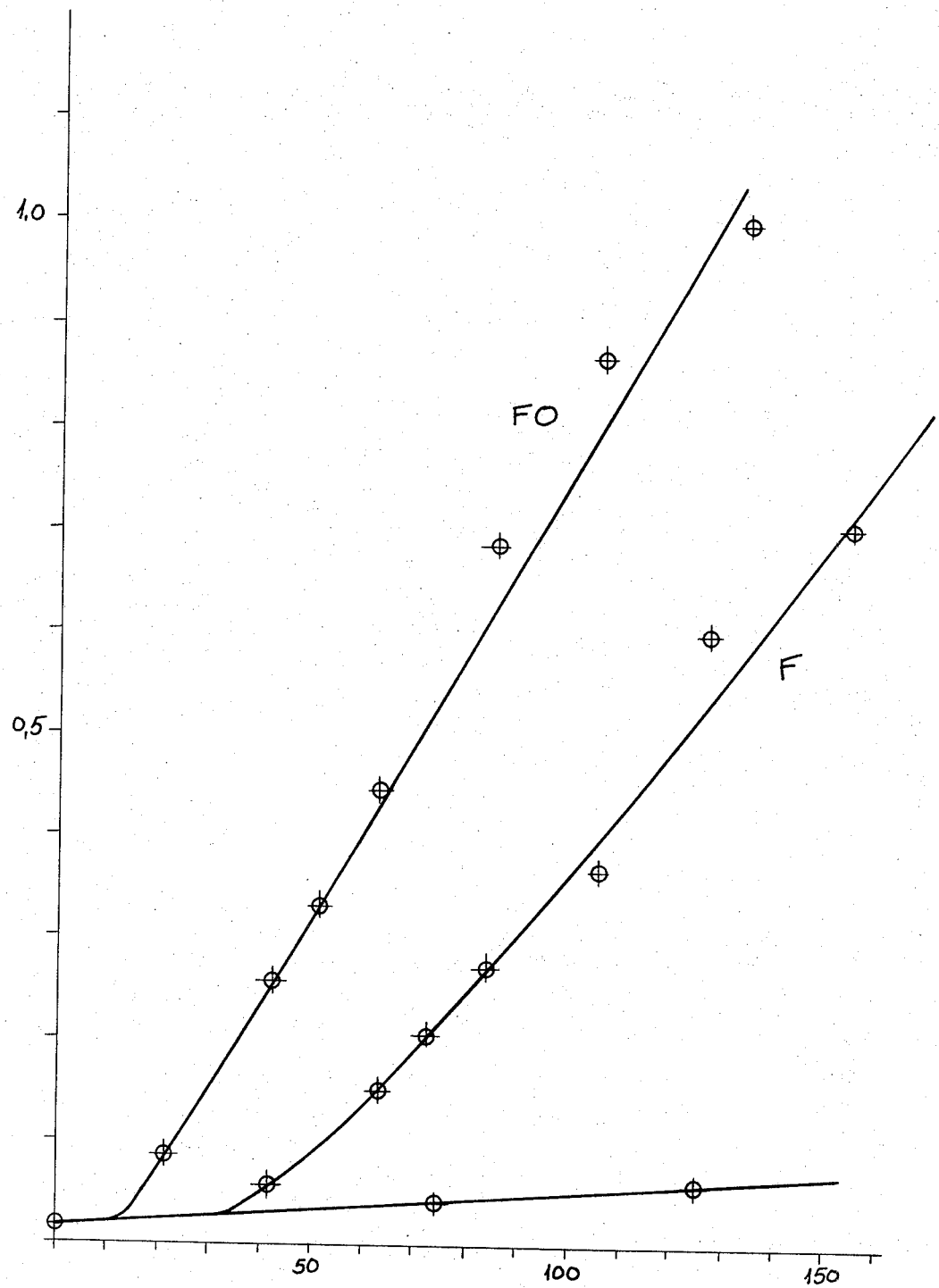
Figure 5:
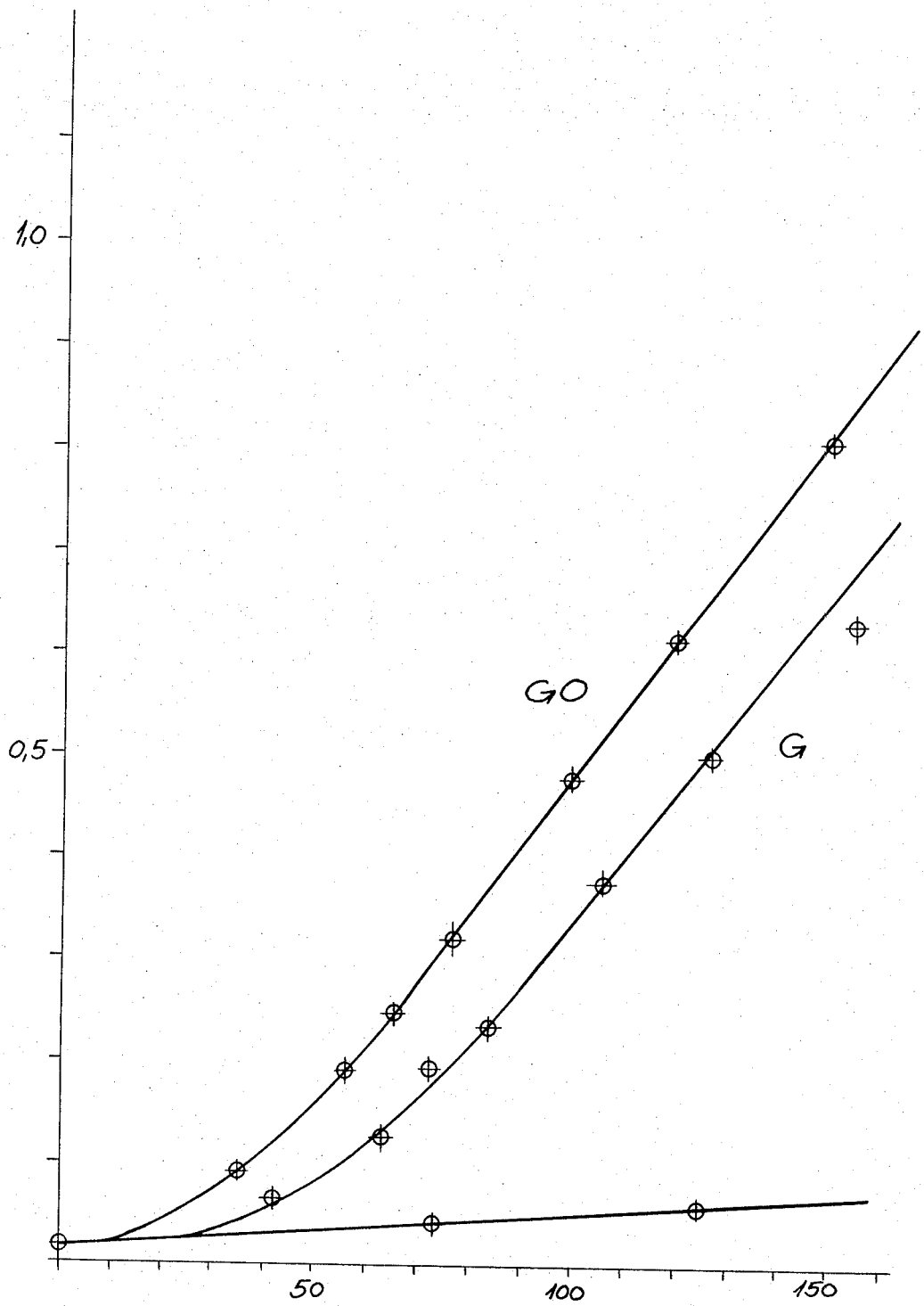

The invention will be described in the following with reference to the following example.

EXAMPLE

Experiments have been made with FeOH(stearate)$_2$ in order to find out how this additive influences polyethylene during radiation with a xenon lamp. As reference a polyethylene film without any additives is used. All films had a thickness of 0.10 to 0.15 mm. The various concentrations of the additive are set forth in the following table.

| Film | Content of 4-octyloxybenzo- phenone (percent by weight) | Content of Fe$^{3+}$OH (stearate)$_2$ (percent by weight) | Content of iron (percent by weight) | |
|---|---|---|---|---|
| A |  | 1.00 | 8.72 | 10$^{-2}$ |
| B |  | 0.75 | 6.54 | do. |
| C |  | 0.50 | 4.36 | do. |
| D |  | 0.25 | 2.18 | do. |
| F |  | 0.10 | 0.87 | do. |
| G |  | 0.05 | 0.44 | do. |
| GO | 0.15 | 0.05 | 0.44 | do. |
| FO | 0.15 | 0.10 | 0.87 | do. |
| DO | 0.15 | 0.25 | 2.18 | do. |

The degradation of the films was followed through IR-spectroscopy at the wave number of about 1770 cm$^{-1}$ and by determining with the aid of the finger tips when the films had become brittle. The results of the experiments are set forth partly in the following tables, partly in the diagrams shown in the appended drawings.

Table 1

| Film | Radiation time required in order that the film may break when folded double powerfully (hrs) | Radiation time required for making the film totally brittle (hrs) |
|---|---|---|
| A | 60 | 90 |
| B | 65 | 100 |
| C | 65 | 110 |
| D | 65 | 125 |
| F | 85 | 190 |
| G | 95 | 200 |
| GO | 90 | 170 |
| FO | 70 | 130 |
| DO | 60 | 120 |
| Zero test | No change in strength during the whole time interval examined | |

Results from previously made experiments out of doors showed that 100 hrs of radiation (Xeno test) of polyethylene films correspond to 23 days of outdoor exposition to light.

Table 2

| Film | Estimated time for making the film totally brittle out of doors at panel experiments (days) |
|---|---|
| A | 21 |
| B | 23 |
| C | 25 |
| D | 29 |
| F | 44 |
| G | 46 |
| GO | 39 |
| FO | 30 |
| DO | 28 |
| Zero test | >1 year |

The results show that at all contents of FeOH(stearate)$_2$ there is an insignificant part of the so-called induction period left, i.e., the period at the beginning of the experiment when no degradation takes place. This may be explained by excitation of the iron compound with consequent photoreduction probably taking place with a certain quantum exchange.

With the guidance of the results obtained it is possible to draw the conclusion that by means of the polymer composition according to the invention which contains an additive acting both as initiator and propagator a degradation is obtained during a sufficiently short time out of doors.

What I claim is:

1. A polymer composition having an enhanced susceptibility to degradation under ultraviolet light and/or sunlight comprising an α-olefin polymer and an amount within the range from about 0.01 to about 2 percent by weight of an iron compound capable of enhancing the susceptibility of the polymer to degradation under ultraviolet light and/or sunlight and having the general formula

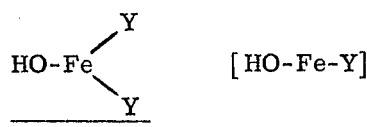

in which Y is an anion of an aliphatic monocarboxylic acid having from about 6 to about 25 carbon atoms.

2. A polymer composition in accordance with claim 1 in which the aliphatic monocarboxylic acid is selected from the group consisting of caprylic acid, stearic acid, palmitic acid, oleic acid, and sebacic acid.

3. A polymer composition in accordance with claim 1 in which the amount of iron compound is within the range from about 0.01 to about 2 percent by weight of the composition.

4. A polymer composition in accordance with claim 1 including a substance accelerating the photolysis of the iron compound.

5. A polymer composition in accordance with claim 4 in which the substance is an aromatic or alkyl aromatic ketone.

* * * * *

UNITED STATES PATENT OFFICE
CERTIFICATE OF CORRECTION

Patent No. 3,865,767          Dated February 11, 1975

Inventor(s) Anders Boberg

It is certified that error appears in the above-identified patent and that said Letters Patent are hereby corrected as shown below:

Column 2, line 9        : "humdity" should be --humidity--

Column 3, line 33       : "abbout" should be --about--

Column 4, line 62       : after "tetraacetic" insert --acid--

Column 7, line 9        : "cm $^{116\ 1}$" should be --cm$^{-1}$--

Signed and Sealed this seventeenth Day of February 1976

[SEAL]

Attest:

RUTH C. MASON
*Attesting Officer*

C. MARSHALL DANN
*Commissioner of Patents and Trademarks*